United States Patent [19]
Joice-Cavanagh

[11] 4,456,415
[45] * Jun. 26, 1984

[54] CARGO BRACING PANEL

[75] Inventor: Roland R. Joice-Cavanagh, Woodside, Calif.

[73] Assignee: Bishop-Wisecarver Corporation, Pittsburgh, Calif.

[*] Notice: The portion of the term of this patent subsequent to Aug. 2, 2000 has been disclaimed.

[21] Appl. No.: 333,043

[22] Filed: Dec. 21, 1981

Related U.S. Application Data

[63] Continuation of Ser. No. 257,380, Apr. 24, 1981, Pat. No. 4,396,325.

[51] Int. Cl.³ .................. B60P 7/14; B61D 45/00; B63B 25/24
[52] U.S. Cl. .................. 410/129; 410/121; 410/151
[58] Field of Search ............ 410/121, 127, 128, 129, 410/145, 146, 149, 151

[56] References Cited

U.S. PATENT DOCUMENTS

| | | | |
|---|---|---|---|
| 923,463 | 6/1909 | Taylor | 410/151 |
| 982,571 | 1/1911 | Brown | 410/127 X |
| 1,951,660 | 3/1934 | Klaudt | 410/145 X |
| 2,565,997 | 8/1951 | Stone | 410/129 |
| 2,594,208 | 4/1952 | Pilot | 410/129 |
| 2,612,848 | 10/1952 | Sowden | 410/151 |
| 3,049,328 | 8/1962 | Bishop | 410/151 X |
| 3,171,627 | 3/1965 | Tapley et al. | 410/146 X |
| 3,329,388 | 7/1967 | Barber | 410/151 X |
| 3,850,332 | 11/1974 | Marko | 410/127 X |
| 3,880,394 | 4/1975 | Wisecarver | |
| 4,023,819 | 5/1977 | Holman, Jr. | 410/151 |
| 4,396,325 | 8/1983 | Joice-Cavanagh | 410/129 |

FOREIGN PATENT DOCUMENTS 833030  4/1960  United Kingdom ............... 410/129

Primary Examiner—Howard Beltran
Attorney, Agent, or Firm—Manfred M. Warren; Robert B. Chickering; Glen R. Grunewald

[57] ABSTRACT

A cargo supporting device, preferably a partition-like member, is constructed for insertion in the interior of a cargo transporting container, such as a truck freight car, or marine cargo carrier, to support the cargo during movement of the container. The partition or bulkhead is constructed of any suitable stiff material and has positioned upon it a pair of foot assemblies at opposite edges disposed to frictionally engage opposite inner walls of the container. One of these foot assemblies includes an adjustable mechanism disposed to move a wall engaging bearing element or pad automatically against the container walls, to apply an increased bearing force to such walls, and to lock the foot assembly, and consequently lock the cargo support device, in a fixed position inside the container against the cargo.

7 Claims, 5 Drawing Figures

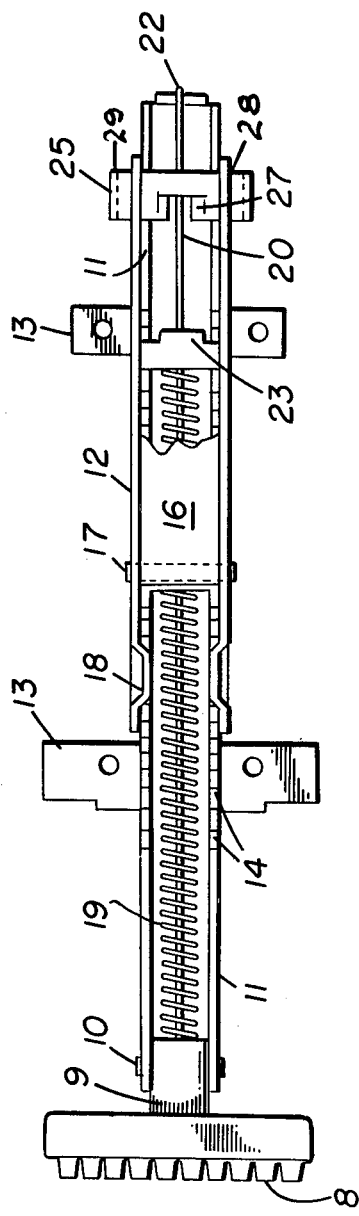
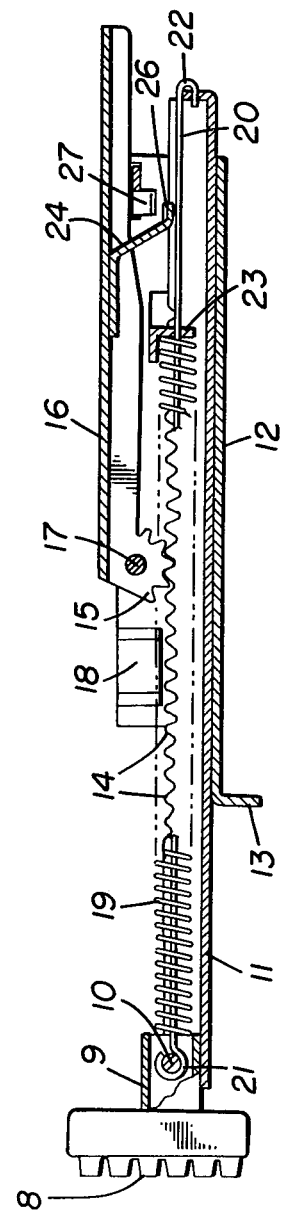
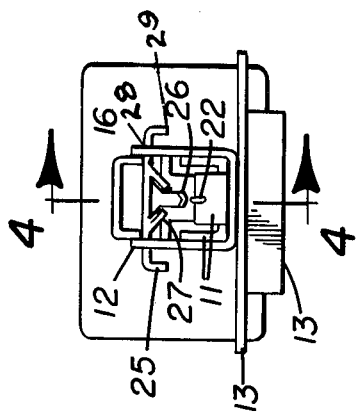
FIG. 3
FIG. 4
FIG. 5

CARGO BRACING PANEL

RELATED APPLICATION

This application is a continuation application based upon co-pending application Ser. No. 257,380, filed Apr. 24, 1981, our U.S. Pat. No. 4,396,325, issued Aug. 2, 1983, and entitled Cargo Bracing Panel.

BACKGROUND OF THE INVENTION

The problem of safely bracing or shoring cargo in transit has existed for some time and several attempts have been made to solve it.

The closest prior art known to applicant is represented by U.S. Pat. No. 3,049,328 to Bishop. This discloses a telescoping cylindrical rod operated by means of a handle engaging a rack and pinion which operates the telescoping elements of the bar and causes it to engage opposite walls of a carrier and thus provide a bracing effect.

U.S. Pat. No. 3,880,394 to Wisecarver discloses a bracing device having a hollow tube and a concentric screw member which may be operated by a nut and wrench attachment forming an integral part of the mechanism in order to change the length of the overall assembly and thus provide a bracing effect.

None of the prior art presently known to applicant teaches the use of a partition or bulkhead equipped with an adjustable or extensible means for holding such a partition-like bracing member or device in position in the interior of a transportation container to protect the cargo from damage during movement of the transporting vehicle.

Moreover, prior art cargo supporting devices have not adequately addressed the problem of accommodating minor differences in the spacing between container walls during placement or installation of the devices. Thus, such prior devices must be held by hand and adjusted or sized before the final securement or bearing force is applied. This can be difficult and time consuming, particularly if a partition-like member is to be used as a cargo supporting device.

DESCRIPTION OF THE DRAWINGS

FIG. 3 is a top view, partially cutaway, showing the mechanism for operation of the extensible element of a foot assembly.

FIG. 4 is a side view, partly in section, of the mechanism of FIG. 3.

FIG. 5 is an end view of the latching mechanism for the device of FIGS. 3 and 4.

DESCRIPTION OF A PREFERRED EMBODIMENT

Figure 1:
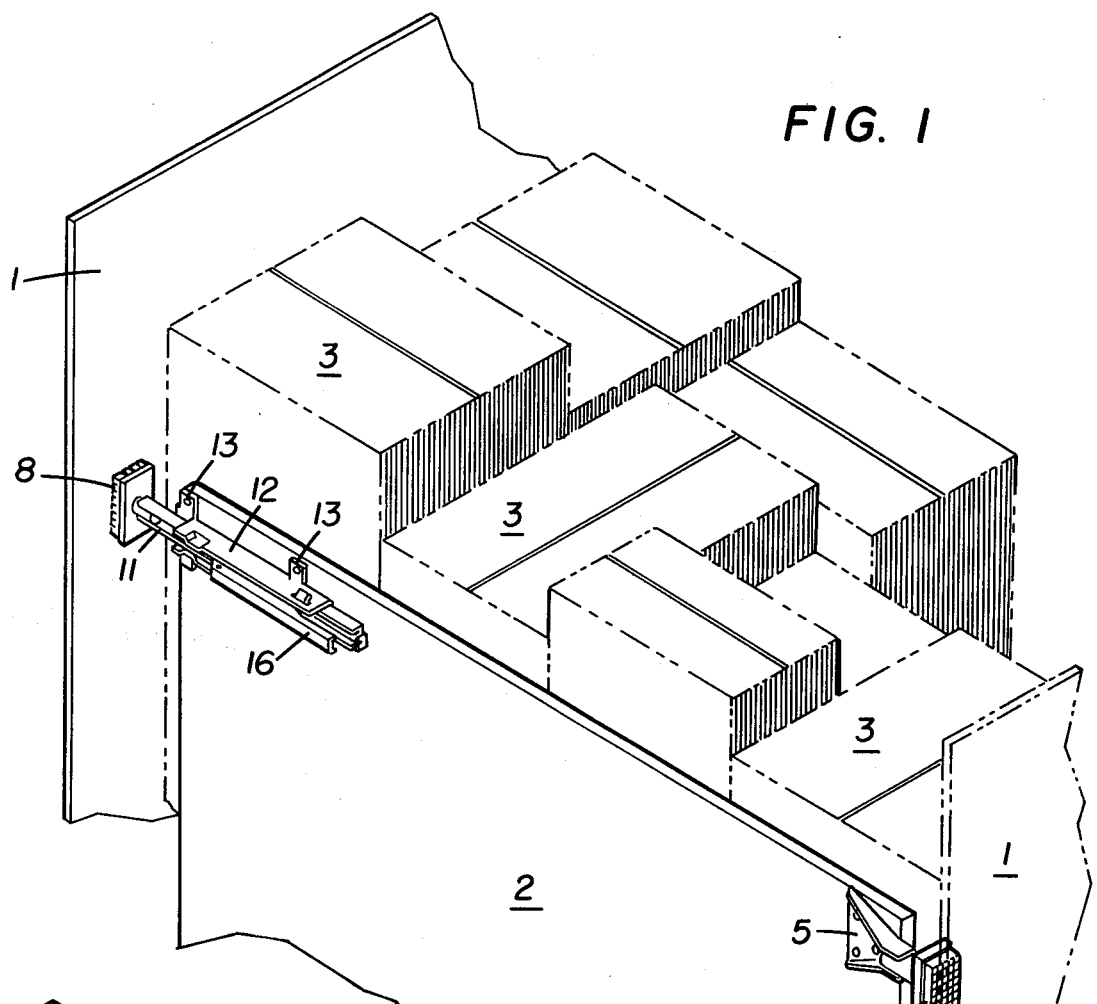
FIG. 1 is an isometric view of a cargo supporting device constructed in accordance with the present invention and in position showing foot assemblies bearing on interior walls of a cargo container and holding cargo in position.
Figure 2:
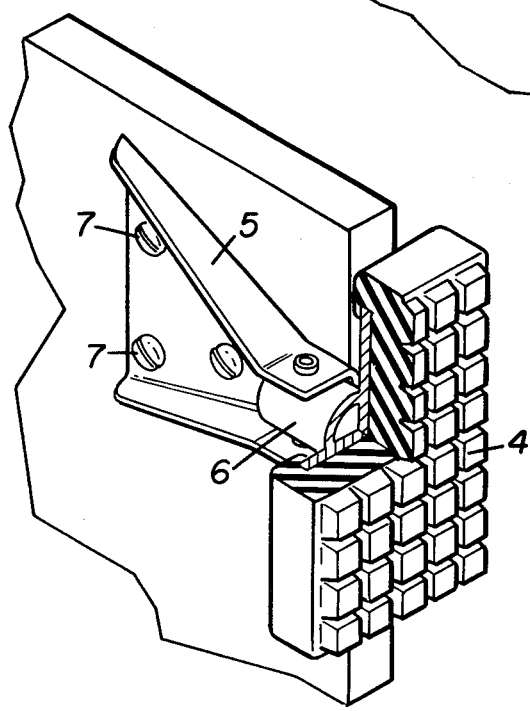
FIG. 2 is an isometric view showing the stationary foot assembly in position on a partition-like member.

Referring first particularly to FIG. 1 and FIG. 2, there may be seen interior walls 1 of a cargo transporting container with cargo supporting device, here shown as partition-like, member 2, positioned therein. Miscellaneous cargo being held in position by partition or bulkhead 2 is shown at 3. Mounted to one end of partition 2 is a first or stationary foot assembly formed with bearing portion or element 4 which I prefer to make as a pad of any suitable elastomeric material and formed with a checkerboard surface. This bearing element is joined to bracket 5 through connector member 6 and is fastened to the surface of bulkhead 2 by means of screws 7.

At the opposite vertical edge of bulkhead 2 is an adjustable or extensible foot assembly formed with bearing portion or element 8, which is similar to pad 4 but is adjustably supported by an adjustment means shown on FIG. 3 and FIG. 4.

Referring to FIGS. 3 and 4, there may be seen pad connector 9 which is attached by a cross pin 10 to "U"-shaped extensible element or mechanism 11. Extensible element 11 is adapted for sliding back and forth in body portion or guide member 12 of the foot assembly. Guide member 12 is preferably also "U"-shaped and is secured to a cargo support member, such as partition or bulkhead 2, by mounting apparatus or tabs 13.

Adjustment of the position of extensible element 11 with respect to body portion 12 is accomplished by adjustment apparatus. The adjustment apparatus includes positive advancement which may be preferably formed by teeth formed in the upper edges of extensible element 11 to provide a rack 14, which meshes with pinion apparatus 15 forming a part of handle 16. Pinion 15 is rotated about pin 17 by handle 16 in engagement with the teeth of rack 14 causing a positively driven backward and forward displacement of extensible element 11. This displacement is transmitted through connector 9 and cross pin 10 to displace the position of pad 8. When handle 16 is rotated around approximately 180 degrees counterclockwise viewing FIG. 4, the flat surface on pinion 15 cause the pinion to come out of mesh with or disengage from rack 14, thus permitting free sliding displacement of extensible element 11. The sides of guide or body portion 12 are crimped inwardly at 18, and this configuration acts to limit the counterclockwise rotary motion of handle 16 inside guide 12.

It is thus seen that by manipulation of handle 16, I may positively drive or force pad 8 carried on extensible element 11 against the adjacent interior wall 1.

In order to facilitate placement or positioning of my mechanism against cargo I employ biasing means such as spring 19, disposed for operation on spring guide 20. The spring guide is anchored at 21 on cross pin 10 and on its opposite end at 22 on "U"-slide 11. The expansion of spring 19 is limited by spring stop 23, which is mounted to extend across guide 12.

The function of spring 19 is best understood by reference to FIG. 4. To initially place or position the cargo supporting device of the present invention, handle 16 is rotated counterclockwise from the position of FIG. 4 to cause pinion 15 to disengage from rack 14 and slide member 11 to be free to move to a relatively extended position. Extensible element 11 is now biased for resilient displacement under the urging of spring 19 independently of the rack and pinion positive advancement means. Spring 19 biases pad carrying extensible element 11 outwardly and during installation and placement pressure on pad 8 will cause inward displacement of extensible element 11 from the fully extended position against the spring biasing force in order to allow accommodation for variations in the spacing between walls.

Accordingly, when extensible element 11 is free to move independently of the rack and pinion, displacement is controlled solely by spring 19. The cargo supporting device, therefore, may be positioned in abutment with cargo 3, and as it is so positioned, the spring of the extensible foot assembly will automatically cause extensible element 11 to be urged toward wall 1 to remove all slack from the assembly. The spring force also assists the user in maintaining the position of the cargo supporting device while the securement or bearing force is applied by the pinion and rack. Thus, any variation in the width between the interior walls of the cargo container are automatically compensated for by the resilient or spring biased mounting of element 11.

Although spring 19 automatically takes the slack out of or sizes the cargo supporting device to the particular container, the increased bearing force required to frictionally secure the cargo supporting device between the interior walls of the container is provided by positive advancement apparatus, namely, rack 14 and pinion 15. The motion of handle 16 in a clockwise direction, from the rotated position during placement of the device toward the position shown in FIG. 4, causes movement of extensible slide member 11, by the action of pinion 15 on rack teeth 14, to the left. Once the pinion engages rack 14, spring 19 no longer controls displacement of element 11. When handle 16 is rotated to the position of FIG. 4, the pressure against the interior walls will be substantial. The action of the latch and locking mechanism described below serves to lock the handle with the bearing pad in a fully advanced position so as to secure the cargo shoring device in place.

Since spring 19 has taken the slack out or sized the cargo supporting device relative to the walls, rotation of handle 16 will produce the same amount of relative interference fit between the cargo supporting device and interior walls. Although some container walls and some cargo support members will flex more than others, a more consistent and reproducible bearing force will be achieved.

In order to maintain adjustable pad 8 in a fixed, advanced position against interior wall 1, I employ a special latch and locking mechanism best seen on FIG. 5.

From the undesirable of handle 16 extends handle latching arm 24 at the outer end of which is a horizontal "V"-shaped handle latch 26. A latch slide 25 is slidable across guide 12 in slots 28 in the sides of guide 12. The motion of slide 25 is limited by stops at its ends 29. One edge of slide 25 opposite the end of handle 16 is notched out to form a pair of prongs 27 projecting inwardly of guide 12. The space between the ends of prongs 27 is just sufficient for the passage of "V"-shaped latch 26 therethrough when latch slide 25 is centrally located in guide 12.

When the entire device is in operating position on the bulkhead as shown in FIG. 1, its longitudinal axis is in a generally horizontal position, and the latch slide 25 is consequently in a vertical position. Latch slide 25 drops by gravity so that its prongs fall out of registry with "V"-shaped latch 26 and obstruct the passage of latch 26 through the space between the prongs, thus preventing manipulation of handle 16 and maintaining the entire mechanism is a locked position.

When it is desired to unlock the mechanism slide latch 25 is pushed up manually so that latch 26 is in alignment with the opening between prongs 27 permitting "V"-shaped latch 26 to pass between prongs 27 and releasing handle 16 for rotation and operation of the mechanism as described above. Handle 16 extends beyond latching arm 24 and beyond the adjacent end of the entire assembly, thus facilitating its manipulation.

Movement of latch slide 25 to a central position to register the space between prongs 27 with the "V"-shaped handle latch 26 permits handle 16 to be raised, thus operating the pinion 15 on rack 14 and releasing pad 8 from its engagement with wall 1. This permits removal of bulkhead 2 until it is again reinstalled to hold a new batch of cargo 3.

I claim:

1. Means for bracing a partition in a transportation container including:
    a bearing element formed for frictional bearing against an adjacent inner wall of said container;
    adjustable mounting means carrying said bearing element and formed for mounting of said bearing element to said partition, said mounting means including:
    a guide member of substantially "U"-shaped cross-section;
    a movable slide member carrying said bearing element and being formed of "U"-shaped cross-section;
    a series of rack teeth provided in the free edges of said slide member;
    a handle pivoted on said guide member;
    pinion means formed on said handle and engaging said teeth;
    said pinion means formed for selective disengagement from said teeth;
    a stop formed to limit the rotation of said handle at about a point where said pinion means becomes disengaged from said teeth enabling said slide member to move independently of said pinion means and said handle;
    a latch projection mounted to one of said handle and said guide member;
    a latch means slidably mounted to a remainder of said handle and said guide member;
    spaced prongs on said latch means;
    said latch projection passing through the space between said prongs into and out of locked attitude; and
    said latch means being slidable into latching position.

2. The device of claim 1 including a spring on said slide member, one end of said spring being fixed to said slide member and the opposite end being fixed to said guide member so as to urge said slide member and said bearing element against said adjacent inner wall.

3. An extensible foot assembly for mounting to a cargo support member to enable use of the member for shoring of cargo in a transportation container, said foot assembly including a body portion formed for mounting to said support member, an elongated extensible element movably mounted to said body portion and having a bearing portion formed to engage and bear against a wall of said container, and adjustment means formed for advancement of said extensible element relative to said body portion and formed for securement of said extensible element in an advanced position to apply a bearing force to said wall, wherein the improvement in said foot assembly is comprised of:
    said adjustment means including spring biasing means formed and mounted to apply a biasing force between said body portion and said extensible element in a direction urging said extensible element toward said advanced position; and
    said adjustment means further including advancement means formed for selective coupling to said extensible element at a position along the length of said extensible element automatically determined by said spring biasing means, said advancement means being further formed to replace said biasing force with an increased bearing force created by positive advancement of said extensible element a predetermined distance toward said advanced position and positive securement of said extensible element in said advanced position, and said advancement means being formed for uncoupling from said extensible element to free said extensible element for displacement independently of said advancement means as urged by said spring biasing means.

4. The extensible foot assembly as defined in claim 3 wherein,
said body portion includes mounting means formed for securement of said foot assembly to a partition-like cargo support member.

5. The extensible foot assembly as defined in claim 3 wherein,
said advancement means is formed as a rack of teeth on said extensible element and pinion means rotatably mounted to said body portion and formed to mate with said rack of teeth, said pinion means including a manually engageable handle coupled for rotation of said pinion means.

6. The extensible foot assembly as defined in claim 5 wherein,
said adjustment means includes latch means formed for locking of said handle in a fixed position for securement of said extensible element in said advanced position.

7. A cargo supporting device for use in shoring cargo in a transportation container including a cargo support member, and pair of foot assemblies mounted to opposite sides of said cargo support member, said foot assemblies being formed to engage and bear upon opposite walls of said container, at least one of said foot assemblies being formed with an extensible element and adjustment means formed for advancement of said extensible element against one of said walls and securement of said extensible element in an advanced position, wherein the improvement in said cargo support assembly is comprised of:
said cargo support member is formed as a partition-like member;
said one of said foot assemblies includes biasing means coupled to said extensible element for resilient displacement of said extensible element and automatic application of a bearing force against said walls during placement of said partition-like member, and said one of said foot assemblies further includes said adjustment means; and
said adjustment means being formed for coupling to said extensible element at a position on said extensible element determined by displacement of said extensible element by said biasing means, said adjustment means being formed to positively displace said extensible element toward said walls a predetermined distance upon coupling to said extensible element and advancement of said extensible element to said advanced position to replace said bearing force generated by said biasing means with a bearing force having an increased magnitude generated by said advancement means, and said advancement means being further formed for retraction of said extensible element and for uncoupling from said extensible element to free said extensible element for displacement by said biasing means.

* * * * *